(12) United States Patent
Trim et al.

(10) Patent No.: US 11,287,876 B2
(45) Date of Patent: Mar. 29, 2022

(54) MANAGING USER MOVEMENT VIA MACHINE LEARNING

(71) Applicant: International Business Machines Corporation, Armonk, NY (US)

(72) Inventors: Craig M. Trim, Ventura, CA (US); Michael Bender, Rye Brook, NY (US); Martin G. Keen, Cary, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 21 days.

(21) Appl. No.: 16/540,059

(22) Filed: Aug. 14, 2019

(65) Prior Publication Data

US 2021/0048879 A1 Feb. 18, 2021

(51) Int. Cl.
*G06F 3/01* (2006.01)
*G06N 20/00* (2019.01)
*G06T 19/00* (2011.01)

(52) U.S. Cl.
CPC .............. *G06F 3/011* (2013.01); *G06F 3/017* (2013.01); *G06N 20/00* (2019.01); *G06T 19/006* (2013.01)

(58) Field of Classification Search
CPC ......... G06F 3/011; G06F 3/017; G06N 20/00; G06T 19/006; A61H 3/00; A61B 5/103; A61B 5/11; A61B 5/1118
See application file for complete search history.

(56) References Cited

U.S. PATENT DOCUMENTS

2004/0102931 A1* 5/2004 Ellis ..................... A61B 5/1118
702/188
2016/0143593 A1* 5/2016 Fu ............................ A61B 5/11
600/595

(Continued)

FOREIGN PATENT DOCUMENTS

CN 106790419 A 5/2017
CN 108877914 A 11/2018

OTHER PUBLICATIONS

Kim, Abraham. Augmented reality projects medical images onto patients. Physics World, Feb. 16, 2018. [4 printed pages] <https://physicsworld.com/a/augmented-reality-projects-medical-images-onto-patients/>.

(Continued)

*Primary Examiner* — Roberto Borja
(74) *Attorney, Agent, or Firm* — The Steadman Law Firm PLLC

(57) ABSTRACT

Techniques are described with respect to managing user movement. An associated method includes constructing a machine learning knowledge model based upon medical data from a plurality of individuals and medical data specific to a user, collecting mobility device sensor data from a plurality of mobility device sensors connected to at least one mobility device associated with the user, and collecting biometric sensor data from a plurality of biometric sensors associated with the user. The method further includes analyzing the mobility device sensor data in view of the biometric sensor data via the machine learning knowledge model to determine a plurality of mobility parameters for the user and determining at least one mobility recommendation for a transport activity in accordance with the plurality of mobility parameters. In an embodiment, the method further (Continued)

includes adapting at least one augmented reality device to digitally represent the at least one mobility recommendation.

20 Claims, 6 Drawing Sheets

(56) References Cited

U.S. PATENT DOCUMENTS

| | | | |
|---|---|---|---|
| 2017/0032692 A1* | 2/2017 | Choi | H04W 4/02 |
| 2017/0172462 A1* | 6/2017 | Alghazi | A61B 5/0205 |
| 2018/0129276 A1* | 5/2018 | Nguyen | G09B 9/00 |
| 2018/0177436 A1* | 6/2018 | Chang | A61B 5/112 |
| 2018/0214091 A1 | 8/2018 | Baker et al. | |
| 2019/0069154 A1* | 2/2019 | Booth | G06F 1/1635 |
| 2019/0103182 A1 | 4/2019 | Borshch et al. | |
| 2019/0336824 A1* | 11/2019 | Fung | A63F 13/65 |
| 2019/0384874 A1* | 12/2019 | Riley | G06T 15/005 |
| 2020/0008712 A1* | 1/2020 | Takenaka | A61B 5/112 |
| 2020/0038709 A1* | 2/2020 | Vissa | G16H 20/30 |
| 2020/0103902 A1* | 4/2020 | Dominic | G05D 1/0231 |

OTHER PUBLICATIONS

Li, Angela et al. Virtual reality and pain management: current trends and future directions. Pain Management, vol. 1, No. 2, Mar. 2, 2011, pp. 147-157.

Moore, Amy et al. Keeping patients safe from falls and pressure ulcers. American Nurse Today, May 2015 vol. 10 No. 5. [8 printed pages] <https://www.americannursetoday.com/keeping-patients-safe-falls-pressure-ulcers/>.

* cited by examiner

MANAGING USER MOVEMENT VIA MACHINE LEARNING

BACKGROUND

The various embodiments described herein generally relate to machine learning. More specifically, the various embodiments relate to managing movement of a user for transport using machine learning techniques.

The IBM Watson Health™ platform facilitates communication in medicine by providing a connected ecosystem across the healthcare industry. Artificial intelligence analytics capabilities of the platform include interpretation of billions of datapoints to identify contextually relevant information, recognition of medical solutions through information aggregation and display, analysis of both structured and unstructured data to present insights for physician consideration, and application of machine learning techniques. Such capabilities enable efficient and cost effective management of an ever-growing quantity of medical data.

Augmented reality technology enables enhancement of user perception of a real-world environment through superimposition of a digital overlay in a display interface providing a view of such environment. Augmented reality enables display of digital elements to highlight or otherwise annotate specific features of the physical world based upon data collection and analysis. For instance, augmented reality can provide respective visualizations of various layers of information relevant to displayed real-world scenes.

SUMMARY

The various embodiments described herein provide techniques of managing movement of a user via machine learning. Such user may be a medical patient or another individual having mobility issues. An associated computer-implemented method includes constructing a machine learning knowledge model based upon medical data from a plurality of individuals and medical data specific to a user, collecting mobility device sensor data from a plurality of mobility device sensors connected to at least one mobility device associated with the user, and collecting biometric sensor data from a plurality of biometric sensors associated with the user. The method further includes analyzing the mobility device sensor data in view of the biometric sensor data via the machine learning knowledge model to determine a plurality of mobility parameters for the user and determining at least one mobility recommendation for a transport activity (e.g., a patient transport activity) in accordance with the plurality of mobility parameters. In an embodiment, the method further includes adapting at least one augmented reality device to digitally represent the at least one mobility recommendation during the transport activity. Additionally or alternatively, the method includes creating a plurality of programmed activities to implement the at least one mobility recommendation during the transport activity. In a further embodiment, the method includes updating one or more aspects associated with the machine learning knowledge model based upon datapoints collected during the transport activity.

In an embodiment, the step of constructing the machine learning knowledge model includes storing the medical data from the plurality of individuals in at least one knowledge base, storing the medical data specific to the user in the at least one knowledge base, and training the machine learning knowledge model based upon the medical data from the plurality of individuals and the medical data specific to the user. In a further embodiment, the step of analyzing the mobility device sensor data in view of the biometric sensor data via the machine learning knowledge model includes identifying one or more patterns between the mobility device sensor data and the biometric sensor data and deriving the plurality of mobility parameters based upon the identified one or more patterns.

In an embodiment, the plurality of mobility parameters include attribute requirements for the at least one mobility device associated with the user. According to such embodiment, the step of adapting the at least one augmented reality device to digitally represent the at least one mobility recommendation during the transport activity includes adapting the at least one augmented reality device to display visual indicia depicting one or more of the attribute requirements for the at least one mobility device associated with the user. In a further embodiment, the plurality of mobility parameters include at least one point of contact with respect to the user at which to facilitate movement of the user or to otherwise interact with the user. Additionally or alternatively, the plurality of mobility parameters include at least one point of avoidance with respect to the user. According to such further embodiment, the step of adapting the at least one augmented reality device to digitally represent the at least one mobility recommendation during the transport activity includes adapting the at least one augmented reality device to display visual indicia depicting the at least one point of contact with respect to the user. Additionally or alternatively, according to such further embodiment, the step of adapting the at least one augmented reality device to digitally represent the at least one mobility recommendation during the transport activity includes adapting the at least one augmented reality device to display visual indicia depicting the at least one point of avoidance with respect to the user.

In a further embodiment, the plurality of mobility parameters include a velocity limit with respect to movement of the user. According to such further embodiment, the step of adapting the at least one augmented reality device to digitally represent the at least one mobility recommendation during the transport activity includes adapting the at least one augmented reality device to display visual indicia depicting the velocity limit with respect to movement of the user. In a further embodiment, the plurality of mobility parameters include a time restriction with respect to movement of the user. According to such further embodiment, the step of adapting the at least one augmented reality device to digitally represent the at least one mobility recommendation during the transport activity includes adapting the at least one augmented reality device to display visual indicia depicting the time restriction with respect to movement of the user. In an additional embodiment, the step of adapting the at least one augmented reality device to digitally represent the at least one mobility recommendation during the transport activity includes, responsive to detecting at least one violation of one or more of the plurality of mobility parameters during the transport activity, identifying at least one corrective action to address the at least one violation, and adapting the at least one augmented reality device to display the at least one corrective action.

One or more additional embodiments pertain to a computer program product including a computer readable storage medium having program instructions embodied therewith. According to such embodiment(s), the program instructions may be executable by a computing device to cause the computing device to perform one or more steps of above recited computer-implemented method. One or more further embodiments pertain to a system having a processor and a memory storing an application program, which, when executed on the processor, performs one or more steps of the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
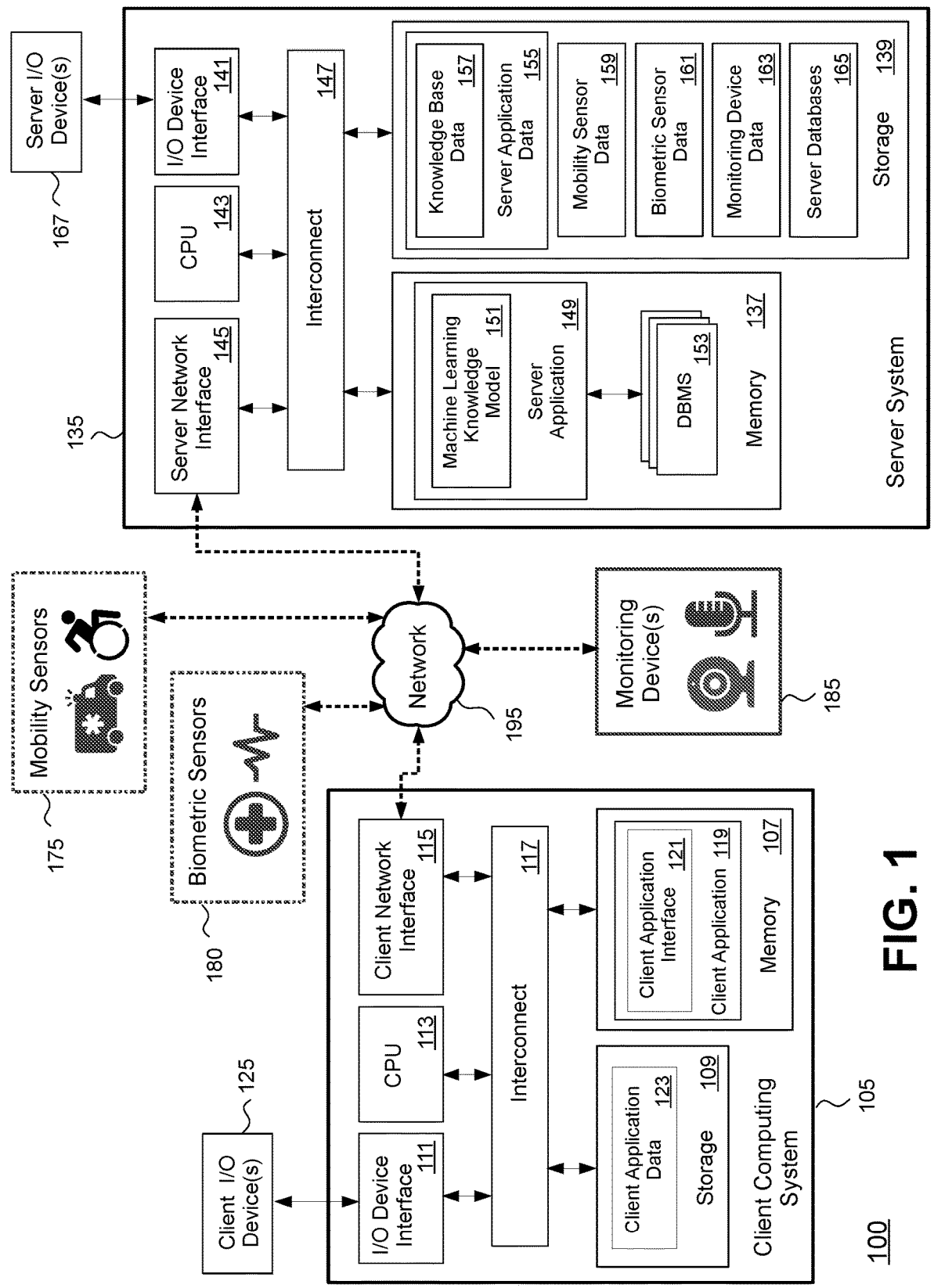
FIG. 1 illustrates a computing infrastructure, according to one or more embodiments.

The various embodiments described herein are directed to managing user movement. A server system configured to implement techniques associated with the various embodiments analyzes mobility device sensor data and biometric sensor data in view of medical data via a machine learning knowledge model in order to determine a plurality of mobility parameters. The server system in turn determines at least one mobility recommendation for a transport activity based upon the plurality of mobility parameters. In the context of the various embodiments described herein, a transport activity is a scenario in which a user is transported from one location to another location. Such user may be any individual having mobility issues, e.g., a medical patient. Such transport activity optionally involves a simple movement of a user within a room or alternatively involves more substantial movement of a user, e.g., from one medical facility to another medical facility, from a medical facility to a user residence, from a user residence to a medical facility, or from one user residence to another user residence.

The various embodiments described herein may have advantages over conventional techniques. Specifically, the various embodiments may facilitate automation of user movement and may improve computer technology by analyzing collected sensor data in view of medical data via machine learning in order to determine a plurality of mobility parameters and to further determine at least one mobility recommendation for a transport activity based upon the plurality of mobility parameters. Furthermore, the various embodiments may improve computer technology by facilitating adaptation of at least one augmented reality device to digitally represent at least one mobility recommendation during a transport activity. Additionally or alternatively, the various embodiments may improve computer technology by creating a plurality of programmed activities to implement at least one mobility recommendation during a transport activity. The various embodiments may enhance user comfort and/or safety during movement. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to managing user movement. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a client computing system 105, a server system 135, a plurality of mobility device sensors 175, a plurality of biometric sensors 180, and monitoring device(s) 185, each connected to a communications network 195.

Illustratively, client computing system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of client computing system 105 are accessed or controlled by one or more clients. Although shown as a single computing system, client computing system 105 is included to be representative of a single client or multiple clients. The one or more clients associated with the client computing system 105 (or multiple respective client computing systems 105) may include at least one entity associated with user movement, including one or more individuals associated with a transport activity (e.g., doctor, nurse, orderly, and/or emergency medical services provider in the context of a transport activity involving a medical patient). In an embodiment, client computing system 105 is a thin client. Memory 107 includes a client application 119. In an embodiment, client application 119 is an online application configured for interfacing with server system 135 and other computing systems. Client application 119 includes a client application interface 121. In the event of multiple clients, multiple instances of client computing system 105 may be present, each having a respective client application 119 including at least one respective client application interface 121. Client application interface 121 includes a graphical user interface (GUI), a command line interface, and/or a sensory interface (e.g., capable of discerning and processing client sound/voice commands and/or client gestures). Storage 109 includes client application data 123 associated with client application 119. One or more components of a GUI, a command line interface, and/or a sensory interface included in client application interface 121 may facilitate client input and/or may facilitate display of client application data 123. I/O device interface 111 is communicatively coupled to client I/O device(s) 125 (e.g., touchscreen console, trackpad, joystick, microphone, speaker, etc.). The client(s) may interact with client application interface(s) 121 via the client I/O device(s) 125. CPU 113 is included to be representative of a single CPU, multiple CPUs, a single CPU having multiple processing cores, and the like. Client network interface 115 is configured to receive data from and transmit data to server system 135 via network 195.

In an embodiment, client computing system 105 includes augmented reality capabilities such that client computing system 105 is capable of rendering and displaying a digital overlay within client application interface 121, e.g., via a GUI or any other interface capable of displaying a digital overlay. Additionally or alternatively, client computing system 105 is communicatively coupled to or otherwise associated with another computing system having augmented reality capabilities, e.g., a dedicated augmented reality device capable of facilitating user movement in the context of a transport activity. Any dedicated augmented reality device includes an interface, e.g., a GUI, capable of displaying a digital overlay. In the context of the various embodiments described herein, an augmented reality device is any device having augmented reality capabilities, i.e., any device capable of rendering and/or displaying a digital overlay upon a representation of a real-world environment. For instance, an augmented reality device may render and/or display a digital overlay upon a captured video feed, a captured audiovisual feed, and/or captured images. Examples of an augmented reality device include a dedicated augmented reality device such as augmented reality glasses, a smartphone having augmented reality capabilities, a smart watch having augmented reality capabilities, a tablet device having augmented reality capabilities, a laptop having augmented reality capabilities, or any other form of computing device having augmented reality capabilities. Augmented reality glasses may include one or more lenses having a capability to display an augmented reality overlay within a field of vision of a wearer. According to the aforementioned embodiments, client computing system 105 is an augmented reality device and/or is communicatively coupled to an augmented reality device. In a further embodiment, client computing system 105 includes autonomous transport capabilities, e.g., via physical hardware components and complementary software components that autonomously or semi-autonomously facilitate user movement in the context of a transport activity. Additionally or alternatively, client computing system 105 is communicatively coupled to or otherwise associated with another client computing system having autonomous or semi-autonomous transport capabilities, e.g., a robotic device having physical hardware components and complementary software components that facilitate user movement in the context of a transport activity.

Although shown as a single computing system, server system 135 is included to be representative of a single server system or multiple server systems. In an embodiment, server system 135 includes a single hardware server configured to provide hosting capabilities. In an alternative embodiment, server system 135 includes, or is otherwise operatively coupled to, a plurality of hardware and/or virtualized servers configured to provide hosting capabilities. In a further alternative embodiment, server system 135 is a cloud server system configured to provide distributed hosting capabilities via a plurality of nodes in a cloud computing environment. According to such further alternative embodiment, the cloud computing nodes are configured to communicate with one another. Additionally, according to such further alternative embodiment, the cloud computing environment optionally offers infrastructure, platforms, and/or software as a service for which client computing system 105 or other systems associated with computing infrastructure 100 need not maintain resources locally.

Illustratively, server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes a server application 149. Server application 149 includes or is otherwise operatively coupled to a machine learning knowledge model representation 151. In an embodiment, server application 149 is configured to execute one or more artificial intelligence algorithms utilizing one or more machine learning techniques via machine learning knowledge model representation 151. According to such embodiment, machine learning knowledge model representation 151 includes or is otherwise operatively coupled to a machine learning knowledge model and at least one knowledge base associated therewith. According to such embodiment, some or all aspects of the machine learning knowledge model may run within server system 135. Additionally or alternatively, some or all aspects of machine learning knowledge model may run externally to server system 135, e.g., via a cloud-based implementation, in which case server system 135 communicates with or accesses such aspects of the machine learning knowledge model via machine learning knowledge model representation 151. Some or all aspects of the at least one knowledge base optionally are incorporated into server system 135. Alternatively, some or all aspects of the at least one knowledge base are externally located and communicatively coupled to server system 135. Memory 137 further includes or is otherwise operatively coupled to database management system (DBMS) 153. DBMS 153 is included to be representative of a single database system or multiple database systems. Server application 149 is configured to manage user transport according to the various embodiments described herein. In an embodiment, server application 149 facilitates authentication of client computing system 105 and/or other client systems in computing infrastructure 100. In an alternative embodiment, server application 149 sends authentication information associated with client computing system 105 and/or other client systems to an external directory server system, which may in turn perform any necessary authentication steps.

Storage 139 includes server application data 155. Server application 149 generates and processes server application data 155 based on interaction with other components of computing infrastructure 100. Server application data 155 includes knowledge base data 157 generated by, used by, or otherwise associated with the machine learning knowledge model. Knowledge base data 157 includes datapoints pertaining to user medical history, user mobility history, and/or user interactions with respect to one or more mobility devices. In an embodiment, knowledge base data 157 includes data associated with the at least one knowledge base. Storage 139 further includes mobility device sensor data 159 associated with (e.g., received from) the plurality of mobility device sensors 175. Storage 139 further includes biometric sensor data 161 associated with (e.g., received from) the plurality of biometric sensors 180. Storage 139 further includes monitoring device data 163 associated with (e.g., received from) the monitoring device(s) 185. Storage 139 further includes server databases 165. DBMS 153 includes or interfaces with at least one software application configured to manage server databases 165. In an embodiment, server application 149 sends database requests to DBMS 153 and processes results returned by DBMS 153. In a further embodiment, server databases 165 include one or more relational databases. In an additional embodiment, server databases 165 include one or more ontology trees or other ontological structures. Server system 135 (and more generally computing infrastructure 100) may include any number of databases. According to a further embodiment, DBMS 153 sends requests to remote databases (not shown) via network 195.

I/O device interface 141 is communicatively coupled to server I/O device(s) 167. CPU 143 is included to be representative of a single CPU, multiple CPUs, a single CPU having multiple processing cores, and the like. Server network interface 145 is configured to receive data from and transmit data to client computing system 105 or other client system(s) via network 195. Specifically, server application 149 is configured to accept requests sent by client computing system 105 or other client system(s) to server system 135 and is configured to transmit data to client computing system 105 or other client system(s) via server network interface 145. Furthermore, server network interface 145 is configured to receive data from and/or transmit data to the plurality of mobility device sensors 175 and/or the plurality of biometric sensors 180 via network 195.

The plurality of mobility device sensors 175 are Internet of Things (IoT) sensors capable of communicating with other systems or devices in computing infrastructure 100, including client computing system 105, server system 135, the plurality of biometric sensors 180, and/or monitoring device(s) 185. In an embodiment, the plurality of mobility device sensors 175 include analog sensors and/or digital sensors. One or more sensors among the plurality of mobility device sensors 175 optionally include both analog characteristics and digital characteristics. In a further embodiment, one or more of the plurality of mobility device sensors 175 are located on, attached to, or otherwise associated with one or more of at least one mobility device associated with user movement. In the context of the various embodiments described herein, a mobility device is a three-dimensional physical component designed to facilitate user movement in the context of a transport activity. Examples of mobility devices include a wheelchair, a stretcher, a mobile bed, a motorized vehicle, an elevator, etc. A mobility device optionally includes autonomous or semi-autonomous capabilities. A mobility device optionally includes software components and/or one or more digital interfaces to facilitate device operation and/or to facilitate interaction with a user or any entity associated with user movement. Additionally or alternatively, one or more of the plurality of mobility device sensors 175 are associated with one or more of monitoring device(s) 185. In a further embodiment, one or more of the plurality of mobility device sensors 175 are embedded in or on a certain mobility device among the at least one mobility device at one or more pressure points of contact between a user and the certain mobility device. According to such further embodiment, the plurality of mobility device sensors 175 record user position (and optionally changes in user position) with respect to the certain mobility device based upon user body position relative to the one or more pressure points of contact. One or more of the plurality of mobility device sensors 175 optionally determine one or more physical characteristics of a user, including height/length and/or weight.

The plurality of biometric sensors 180 are IoT sensors capable of communicating with other systems or devices in computing infrastructure 100, including client computing system 105, server system 135, the plurality of mobility device sensors 175, and/or monitoring device(s) 185. In an embodiment, the plurality of biometric sensors 180 include analog sensors and/or digital sensors. One or more sensors among the plurality of biometric sensors 180 optionally include both analog characteristics and digital characteristics. In a further embodiment, one or more of the plurality of biometric sensors 180 are located on or otherwise attached to a user, subject to the consent of such user or a legal representative of such user. Additionally or alternatively, one or more of the plurality of biometric sensors 180 otherwise are operatively coupled to or associated with a user.

Monitoring device(s) 185 optionally include one or more video capture and/or video monitoring devices configured to record or otherwise process video data with respect to a user and/or one or more mobility devices among at least one mobility device associated with user movement. Additionally or alternatively, monitoring device(s) 185 optionally include one or more audio capture devices, one or more audio recorders, and/or one or more audio monitoring devices configured to record or otherwise process audio data with respect to a user and/or one or more mobility devices among the at least one mobility device. Additionally or alternatively, monitoring device(s) 185 optionally include one or more audiovisual capture and/or audiovisual monitoring devices configured to record or otherwise process audiovisual data with respect to a user and/or one or more mobility devices among the at least one mobility device. Additionally or alternatively, monitoring device(s) 185 optionally include one or more photographic capture devices or other image capture devices configured to capture one or more images with respect to a user and/or one or more mobility devices among the at least one mobility device.

Figure 2:
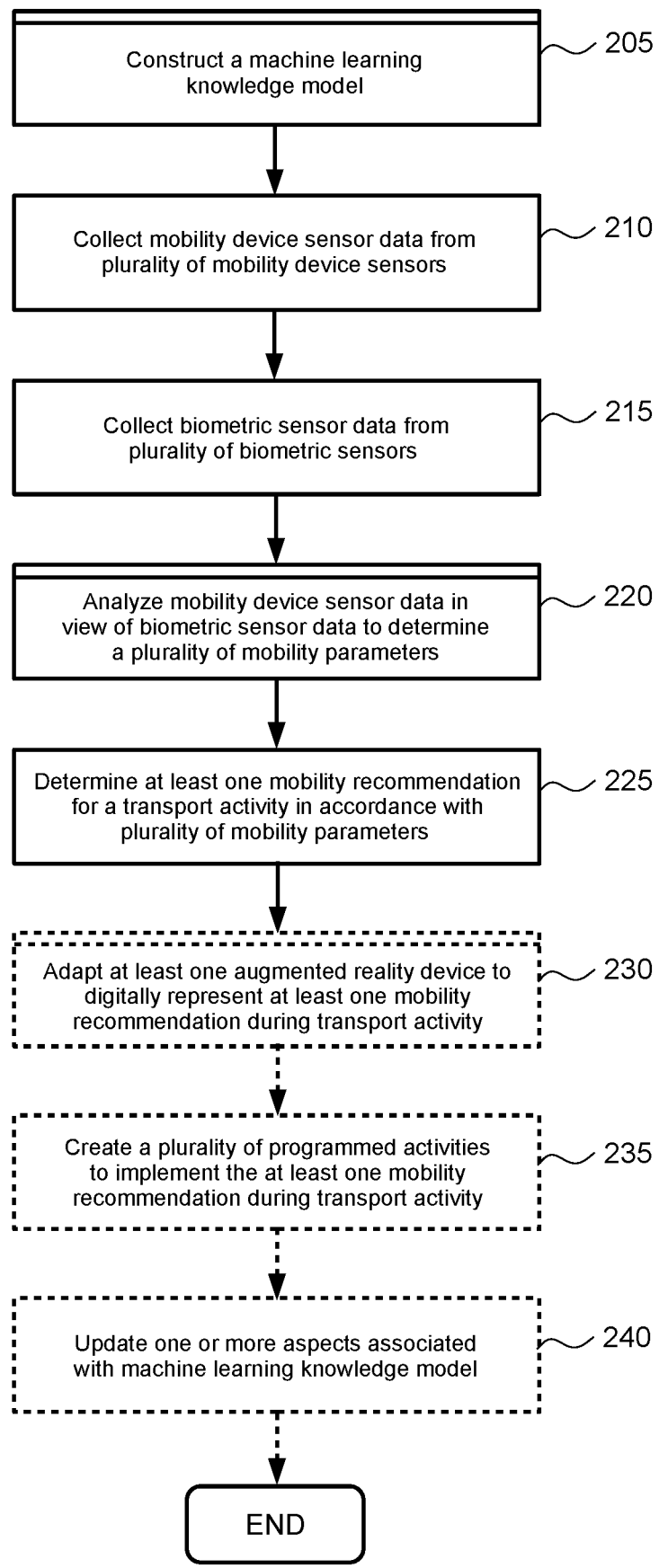
FIG. 2 illustrates a method of managing movement of a user via machine learning in the context of a transport activity, according to one or more embodiments.

FIG. 2 illustrates a method 200 of managing user movement via machine learning. In the context of the method 200 and the other methods described herein, a user may be a medical patient or other individual having mobility requirements. One or more steps associated with the method 200 and the other methods described herein may be carried out in a client-server computing environment (e.g., computing infrastructure 100) including a network (e.g., network 195). A server application in a server system of the client-server computing environment (e.g., server application 149 in server system 135 of computing infrastructure 100) facilitates processing according to the method 200 and the other methods described herein. The server application interacts with each of one or more clients via a respective client interface associated with a client application of a client computing system (e.g., client application interface 121 associated with client application 119 of client computing system 105). In the context of the method 200 and the other methods described herein, the one or more clients optionally include one or more entities associated with user movement. In an embodiment, a respective client interface optionally includes a display having augmented reality capabilities and/or includes a display operatively coupled to, communicatively coupled to, or otherwise associated with an augmented reality device (e.g., augmented reality glasses) or other client computing system having augmented reality capabilities. In a further embodiment, a respective client interface optionally includes a display operatively coupled to, communicatively coupled to, or otherwise associated with a device having autonomous or semi-autonomous transport capabilities to facilitate user movement, e.g., a robotic device or an autonomous/semi-autonomous mobility device. Additionally or alternatively to the client-server computing environment, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment, in which case one or more of the method steps described herein may be carried out via a peer application of a peer computing system.

In the context of the method 200 and the other methods described herein, the server application provides (or is capable of providing) a user (or a legal representative of the user) as well as any entity associated with user movement advance notice of any personal data collection, including data collection via sensors, monitoring device(s), augmented reality device(s), and/or autonomous/semi-autonomous device(s). The server application further provides any affected individual an option to opt in or opt out of any such personal data collection at any time. Optionally, the server application further transmits at least one notification to any affected individual each time any such personal data collection occurs.

The method 200 begins at step 205, where the server application constructs a machine learning knowledge model based upon medical data from a plurality of individuals and medical data specific to a user. The machine learning knowledge model in the context of the various embodiments is a user movement learning model. In an embodiment, the server application stores the medical data associated with the plurality of individuals and the medical data specific to the user among knowledge base data (e.g., knowledge base data 157) associated with the machine learning knowledge model. The server application interfaces with the machine learning knowledge model via a model representation (e.g., machine learning knowledge model representation 151). A method of constructing the machine learning knowledge model in accordance with step 205 is described with respect to FIG. 3.

At step 210, the server application collects mobility device sensor data from a plurality of mobility device sensors connected to at least one mobility device associated with the user (e.g., the plurality of mobility device sensors 175). While associated with user movement, the at least one mobility device optionally supports the user in one or more stationary positions for one or more periods prior to, during, or subsequent to user movement. In the context of the various embodiments described herein, a mobility device includes a wheelchair, a stretcher, a motorized vehicle, an elevator, etc. In an embodiment, the server application updates the machine learning knowledge model constructed at step 205 based upon the collected mobility device sensor data. According to such embodiment, the server application optionally adds the collected mobility device sensor data to the knowledge base data associated with the machine learning knowledge model. Additionally or alternatively, the server application identifies any correlation between aspects of the medical data based upon which the server application constructs the machine learning knowledge model at step 205 and aspects of the collected mobility device sensor data. For instance, the server application may identify a correlation between medical data indicating a history of lower body ailments and mobility device sensor data indicating abnormally difficult transport movement associated with the lower body of the user. In a further embodiment, the server application collects the mobility device sensor data for a predefined duration of time, e.g., during a user transport evaluation period. The predefined duration of time optionally is determined by the server application or alternatively is determined by a medical professional or a mobility specialist. According to such further embodiment, the server application stores the mobility device sensor data in at least one database (local and/or cloud-based) and timestamps and/or logs such data. The mobility device sensor data includes data from one or more mobility device sensors affixed to or other otherwise associated with the at least one mobility device and/or equipment related to the at least one mobility device. Additionally or alternatively, the mobility device sensor data includes data from sensors associated with one or more monitoring devices, such as a camera, a microphone, or other audio/video/audiovisual recording device (e.g., monitoring device(s) 185). The one or more monitoring devices record audio, video, and/or audiovisual data associated with user transport via the at least one mobility device. The mobility device sensor data optionally determines details of the at least one mobility device and any associated equipment used to facilitate user transport.

In an embodiment, the server application collects the mobility device sensor data at step 210 by collecting sensor data from one or more transport movements of the user and/or one or more transport movements of other individuals having physical characteristics and/or health conditions similar or identical to the user. According to such embodiment, the at least one database in which the server application stores the mobility device sensor data is at least one database associated with user movement. The at least one database associated with user movement optionally further includes one or more aspects of the medical data based upon which the server application constructs the machine learning knowledge model at step 205. The at least one database associated with user movement optionally includes user movement datapoints representing aspects of all movements of the user, e.g., over the predefined duration of time as well as newly collected movements during any user movement. The server application optionally applies at least one clustering algorithm to such user movement datapoints in order to determine one or more user movement trends. The at least one database associated with user movement optionally is linked to or otherwise associated with the knowledge base data. Aspects of the at least one database associated with user movement optionally are included within/operatively coupled to the server system (e.g., included within server databases 165) and/or are located external to the server system (e.g., cloud based).

At step 215, the server application collects biometric sensor data from a plurality of biometric sensors associated with the user (e.g., the plurality of biometric sensors 180). In an embodiment, the server application updates the constructed machine learning knowledge model based upon the collected biometric sensor data. According to such embodiment, the server application optionally adds the collected biometric sensor data to the knowledge base data. Additionally or alternatively, the server application identifies any correlation between aspects of the medical data based upon which the server application constructs the machine learning knowledge model at step 205 and aspects of the collected biometric sensor data. For instance, the server application may identify a correlation between medical data indicating a history of respiratory ailments and biometric sensor data indicating user breathing issues. In a further embodiment, the server application collects the biometric sensor data for the predefined duration of time. According to such further embodiment, the server application stores such biometric sensor data in at least one database, e.g., the at least one database associated with user movement and/or a database associated with user biometrics, and timestamps and/or logs such data. In a further embodiment, one or more of the plurality of biometric sensors are incorporated into or otherwise affixed to clothing of the user, are incorporated into an object worn by or attached to the user (e.g., watch, bracelet, headgear), and/or are injected or otherwise embedded in the user (e.g., under the skin), subject to user consent. In a further embodiment, the server application obtains vital sign datapoints based upon the biometric sensor data. Vital signs measured by one or more of the plurality of biometric sensors optionally include body temperature, blood pressure, pulse/heart rate, and breathing rate/respiratory rate. For instance, the server application may receive information from one or more of the plurality of biometric sensors (specifically, respiratory sensors) indicating that breathing of the user has substantially slowed or ceased. In a further embodiment, optionally in conjunction with collection of the biometric sensor data, the server application analyzes one or more images, a video feed, an audio feed, and/or an audiovisual feed captured from the one or more monitoring devices to identify at least one overt medical risk factor (a visible medical risk factor and/or an audible medical risk factor), such as bleeding, heavy breathing, choking, seizure, emotional distress, etc. For instance, an audio monitoring device may detect labored breathing sounds emitted from the user, and/or a video monitoring device may capture images of the user depicting significant respiratory distress.

At step 220, the server application analyzes the mobility device sensor data in view of the biometric sensor data via the machine learning knowledge model to determine a plurality of mobility parameters for the user. By determining the plurality of mobility parameters via analysis of the mobility device sensor data in view of the biometric sensor data, the server application identifies any correlation between the mobility device sensor data and the biometric sensor data. The plurality of mobility parameters may establish guidelines for any entity associated with user movement. Such guidelines may include limits, accepted ranges, and/or other information with respect to handling of the user, with respect to an environment through which to transport the user, and/or with respect to mobility device attribute requirements. In an embodiment, the server application adds the plurality of mobility parameters to the knowledge base data. In a further embodiment, the server application adds the plurality of mobility parameters to the at least one database associated with user movement. A method of analyzing the mobility device sensor data in view of the biometric sensor data via the machine learning knowledge model to determine the plurality of mobility parameters in accordance with step 220 is described with respect to FIG. 4.

At step 225, the server application determines at least one mobility recommendation for a transport activity in accordance with the plurality of mobility parameters. In an embodiment, in the event that the user is a medical patient, the transport activity is a patient transport activity. In a further embodiment, the server application incorporates aspects of the plurality of mobility parameters into the at least one mobility recommendation to ensure that the transport activity is conducted according to the plurality of mobility parameters. According to such further embodiment, the server application incorporates into the at least one mobility recommendation any limit and/or any accepted range established in the plurality of mobility parameters. In another embodiment, the at least one mobility recommendation includes at least one user movement instruction capable of being digitally represented via a video feed, an audio feed, an audiovisual feed, and/or a digital overlay upon a video/audiovisual feed or a series of images (e.g., in the context of augmented reality). Additionally or alternatively, the at least one mobility recommendation includes at least one user movement instruction capable of facilitating execution of autonomous or semi-autonomous activities related to user movement, e.g., at least one computer program instruction executable by a robotic device or other device facilitating autonomous or semi-autonomous user movement.

Optionally, at step 230, the server application adapts at least one augmented reality device to digitally represent the at least one mobility recommendation during the transport activity. The at least one augmented reality device includes at least one dedicated augmented reality device and/or at least one computing device having augmented reality capabilities. In an embodiment, the server application creates a visualization that digitally represents the at least one mobility recommendation determined at step 225. According to such embodiment, the server application adapts the at least one augmented reality device to display the created visualization in at least one augmented reality interface associated therewith. In the context of the various embodiments described herein, an augmented reality interface is a client application interface (e.g., client application interface 121) or another interface having augmented reality capabilities (e.g., a digital interface associated with a dedicated augmented reality device). Such augmented reality interface includes a GUI and/or any other interface capable of displaying an augmented reality visualization. The server application adapts the at least one augmented reality device to display the created visualization by adapting the at least one augmented reality device to render and display an overlay of digital content including such visualization in the at least one augmented reality interface. The server application adapts the at least one augmented reality device to render and display the digital overlay upon a representation of a real-world environment, e.g., upon a captured video feed and/or captured images of the user, upon an audiovisual representation of the at least one mobility device used for the transport activity, and/or upon an audiovisual representation of the transport environment (i.e., the environment in which the user is moved during the transport activity). Such audiovisual representation of the at least one mobility device optionally includes a real time audiovisual feed of the at least one mobility device displayed within the at least one augmented reality interface. Such audiovisual representation of the transport environment optionally includes a real time audiovisual feed of the transport environment displayed within the at least one augmented reality interface.

In an additional embodiment, the server application adapts the at least one augmented reality device to digitally represent the at least one mobility recommendation during the transport activity by digitally representing any limit and/or any accepted range incorporated into the at least one mobility recommendation from the plurality of mobility parameters. According to such additional embodiment, the overlay of digital content displayed in the at least one augmented reality interface reflects the plurality of mobility parameters. In a further embodiment, the server application adapts the at least one augmented reality device to render and display indicia illustrating at least one recommended area of interaction and/or at least one area of avoidance (i.e., at least one area to avoid) with respect to user movement. Such at least one recommended area of interaction and/or such at least one area of avoidance optionally pertain to point(s) of contact with respect to the body of the user, point(s) of handling with respect to the at least one mobility device, and/or movement recommendation(s) for the at least one mobility device with respect to the environment in which the user is moved. One or more entities associated with the transport activity or other relevant aspects of user movement optionally review the digital representation of the at least one mobility recommendation as provided via the at least one augmented reality device to facilitate movement of the user in accordance with the plurality of mobility parameters. Methods of adapting the at least one augmented reality device to digitally represent the at least one mobility recommendation during the transport activity in accordance with step 230 are described with respect to FIG. 5 and FIG. 6.

Optionally, at step 235, the server application creates a plurality of programmed activities to implement the at least one mobility recommendation during the transport activity. In an embodiment, the plurality of programmed activities includes a set of computer program instructions input, propagated, or otherwise delivered to at least one robotic device or to at least one computing device operatively coupled to at least one robotic device in order to facilitate autonomous or semi-autonomous movement of the user during the transport activity. In an embodiment, the server application includes in the plurality of programmed activities any limit and/or any accepted range incorporated into the at least one mobility recommendation from the plurality of mobility parameters. In a further embodiment, the server application facilitates both augmented reality according to step 230 and programmed activities according to step 235. In a further embodiment, in the context of creating the plurality of programmed activities, the server application adapts at least one robotic device to deliver audio-based, video-based, and/or audiovisual commands reflective of the at least one mobility recommendation to one or more entities associated with the transport activity or other relevant aspects of user movement. For instance, the server application may adapt at least one robotic device to issue an audio warning to any such entity responsive to detecting at least one violation of one or more of the plurality of mobility parameters during the transport activity.

Optionally, at step 240, the server application updates one or more aspects associated with the machine learning knowledge model based upon datapoints collected during the transport activity. In an embodiment, the server application updates the machine learning knowledge model based upon datapoints collected with respect to application of the plurality of mobility parameters in the context of the transport activity. According to such embodiment, the collected datapoints optionally include aspects recorded with respect to each user movement phase during the transport activity. Additionally or alternatively, the collected datapoints optionally include aspects recorded with respect to the entire transport activity. Aspects recorded for a given user movement phase and/or for the entire transport activity include timeframe of movement, mobility device(s) used for such movement, a listing of any entity who facilitated such movement (medical professional or otherwise), location of such movement (including any relevant starting location, ending location, and/or one or more intermediate locations), duration of such movement, average velocity of such movement, etc. In a further embodiment, the server application incorporates the collected datapoints into the knowledge base data associated with the machine learning knowledge model. According to such further embodiment, the server application monitors collected sensor data in real time during the transport activity for purposes of updating one or more aspects of the machine learning knowledge model or the knowledge base data. Additionally or alternatively, the server application records or facilitates recording of the collected datapoints in an activity log of user movements and/or otherwise stores such datapoints in at least one database, e.g., the at least one database associated with user movement.

Figure 3:
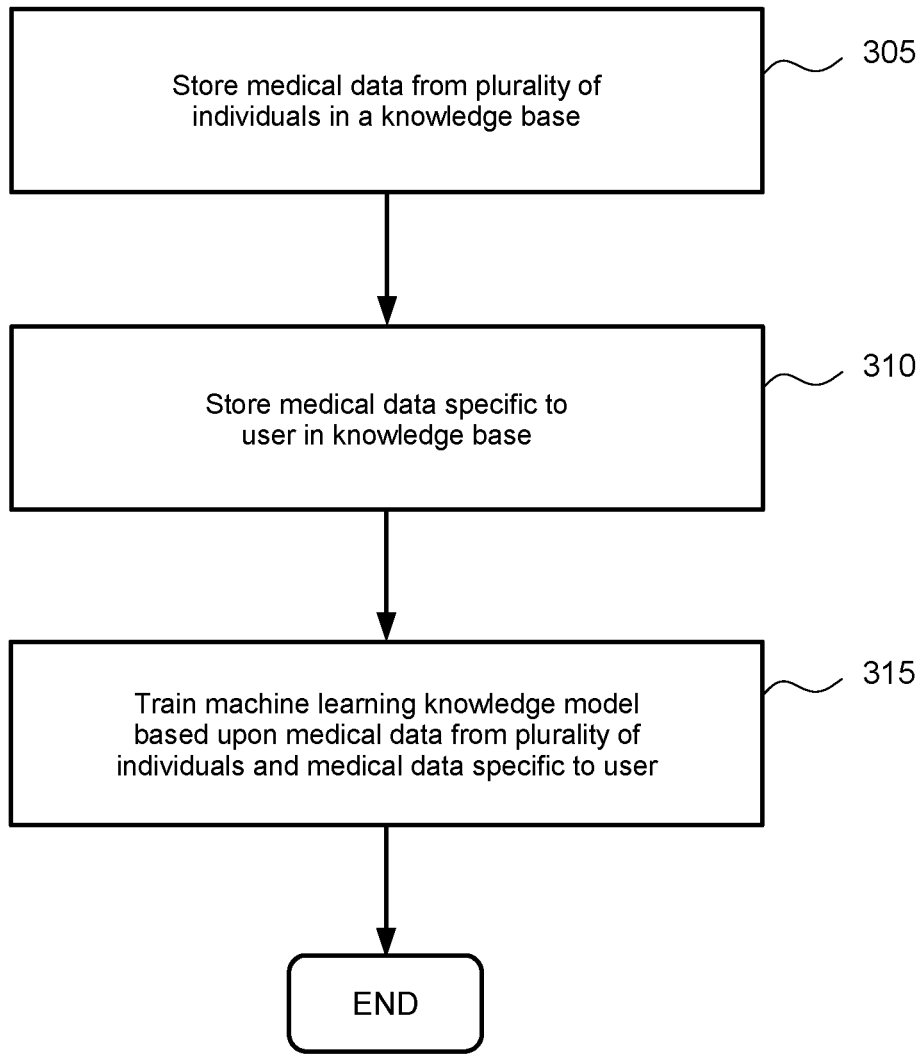
FIG. 3 illustrates a method of constructing a machine learning knowledge model, according to one or more embodiments.

FIG. 3 illustrates a method 300 of constructing the machine learning knowledge model. The method 300 provides one or more example embodiments with respect to step 205 of the method 200. The method 300 begins at step 305, where the server application stores the medical data from the plurality of individuals in at least one knowledge base, e.g., configured to store some or all aspects of the knowledge base data associated with the machine learning knowledge model. The medical data from the plurality of individuals includes, inter alia, age range data, gender data, health condition data, medical scans, disease history/severity, disease treatments/procedures, history of user transport activities, records of medical appointments/consultations, and/or records of hospital/medical facility visits. In an embodiment, the server application applies natural language processing (e.g., natural language understanding) to medical documentation related to any medical disease or condition of one or more of the plurality of individuals in order to identify any mobility symptoms associated with such individual(s). The server application optionally obtains such medical data from one or more data sources, subject to consent from any affected individual.

At step 310, the server application stores the medical data specific to the user in the at least one knowledge base. The medical data specific to the user includes, inter alia, age range, gender, health conditions, medical scans, disease history/severity, disease treatments/procedures, history of user transport activities, records of medical appointments/consultations, and/or records of hospital/medical facility visits. In an embodiment, the server application applies natural language processing (e.g., natural language understanding) to medical documentation related to any medical disease or condition of the user in order to identify any mobility symptoms associated with the user as well as any point of recommended interaction and/or any point of avoidance associated with the user based upon such mobility symptoms. The server application optionally obtains such medical data from one or more data sources, subject to consent from the user. In an embodiment, the server application stores the medical data processed at step 305 and/or step 310 in the form of medical datapoints. Such medical datapoints optionally include associated metadata, e.g., time/date information, tag(s) for purposes of datapoint classification, information indicating relationship(s) with respect to other medical datapoints, etc.

At step 315, the server application trains the machine learning knowledge model based upon the medical data from the plurality of individuals stored at step 305 and based upon the medical data specific to the user stored at step 310. In an embodiment, the server application trains the machine learning knowledge model by processing medical datapoints with respect to the medical data from the plurality of individuals and the medical data specific to the user. The server application optionally trains the model by comparing medical datapoints specific to the user with medical datapoints of individuals among the plurality of individuals similar to the user, e.g., individuals of the same gender, within the same age group, having the same or similar preexisting medical condition(s), etc. The server application optionally applies at least one clustering algorithm and/or another artificial intelligence algorithm based upon the compared medical datapoints to determine one or more medical trends with respect to user movement. For instance, based upon comparison of medical datapoints specific to the user and medical datapoints of similar individuals, the server application may determine that the user potentially is susceptible to one or more medical conditions present in similar individuals that may affect movement, even if the user currently has no symptoms associated with the one or more medical conditions. Furthermore, the server application compares such medical datapoints in order to establish expected data ranges with respect to individual vital signs and/or behaviors. The server application stores the medical datapoints among the knowledge base data associated with the machine learning knowledge model.

Figure 4:
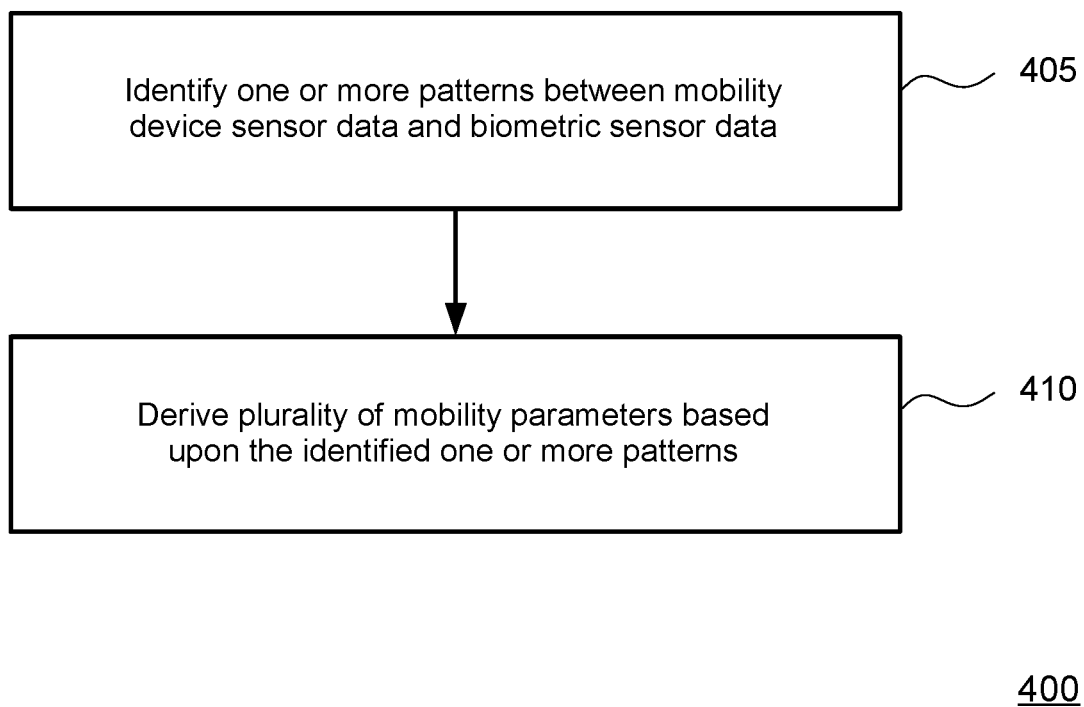
FIG. 4 illustrates a method of analyzing biometric sensor data in view of mobility device sensor data via a machine learning knowledge model, according to one or more embodiments.

FIG. 4 illustrates a method 400 of analyzing the mobility device sensor data in view of the biometric sensor data via the machine learning knowledge model to determine the plurality of mobility parameters. The method 400 provides one or more example embodiments with respect to step 220 of the method 200. The method 400 begins at step 405, where the server application identifies one or more patterns between the mobility device sensor data and the biometric sensor data. In an embodiment, based upon medical data aspects of the trained machine learning knowledge model, the server application identifies the one or more patterns by comparing the mobility device sensor data and the biometric sensor data to detect any correlation between user movements as determined from mobility device datapoints (e.g., as stored and processed in the at least one database associated with user movement) and fluctuations in a comfort level of the user as determined at least in part from biometric datapoints. According to such embodiment, any timestamp data associated with the mobility device sensor data and the biometric sensor data facilitates detection of any such correlation. In the context of the various embodiments described herein, the comfort level of the user quantifies pain, posture, and/or other aspects of user welfare on a predefined comfort scale. In an embodiment, the predefined comfort scale is an integer scale, with a lowest integer (e.g., "0") indicating lowest relative comfort and a highest integer (e.g., "10") indicating highest relative comfort. The predefined comfort scale optionally is defined by the server application or alternatively is defined by a medical professional or a mobility specialist. A relatively higher comfort level indicates relatively lower pain, better posture, and/or better biometric datapoints (e.g., vital signs), while a relatively lower comfort level indicates relatively higher pain, worse posture, and/or worse biometric datapoints. For instance, the machine learning knowledge model trained based upon medical data may indicate difficulty in certain movements among the user and other individuals having a history of a certain medical condition (e.g., heart arrhythmia). Accordingly, per the trained model the server application identifies a pattern between certain movements of the user as determined through the collected mobility device sensor data and a lower user comfort level resulting from adverse vital sign data reflective of the certain medical condition as determined through the collected biometric sensor data (e.g., irregular heart rate data immediately following the certain movements of the user).

At step 410, the server application derives the plurality of mobility parameters based upon the identified one or more patterns. In an embodiment, based upon the identified one or more patterns, the server application derives the plurality of mobility parameters in order to maintain the comfort level of the user at or above a predefined comfort threshold. The predefined comfort threshold optionally is determined by the server application or alternatively is determined by a medical professional or a mobility specialist. Based upon application of the trained machine learning knowledge model, the server application determines the plurality of mobility parameters to facilitate efficient user movement while maintaining the comfort level of the user at or above the predefined comfort threshold. In a further embodiment, the plurality of mobility parameters include datapoints (e.g., in a prioritized list) for purposes of evaluating techniques by which to move the user.

In an embodiment, the plurality of mobility parameters determined in the context of step 220 and optionally derived in the context of the method 400 include attribute requirements for the at least one mobility device associated with the user. In an embodiment, the server application determines the attribute requirements based upon the medical data specific to the user as stored in the machine learning knowledge model and/or based upon the identified one or more patterns between the collected mobility device sensor data and the collected biometric sensor data. In a further embodiment, the attribute requirements for the at least one mobility device include size requirement(s) (e.g., length/width/height limits or ranges), configuration requirement(s) (e.g., reclining angle range, device cushioning requirement), and/or a vibration limit associated with the at least one mobility device. In a further embodiment, the attribute requirements for the at least one mobility device include device type datapoints. Optionally, in the event that there are a plurality of mobility devices associated with the user, the server application determines device type datapoints including a prioritized list of the plurality of mobility devices. Such prioritized list optionally orders respective mobility devices from best to worst in the context of one or more phases of the transport activity and/or in the context of the entire transport activity. For instance, in determining a prioritized list of mobility devices, the server application may analyze one or more patterns identified between the mobility device sensor data and the biometric sensor data and based upon such analysis may determine that increased wheelchair use is directly correlated with increased spinal issues for the user. Consequently, the server application may determine that the comfort level of the user would be increased or otherwise optimized by moving the user via stretcher as opposed to via wheelchair, and accordingly the server application may prioritize a stretcher over a wheelchair in the prioritized list of mobility devices. The server application optionally propagates or otherwise communicates the prioritized list of mobility devices to one or more entities associated with the transport activity or other relevant aspects of user movement.

In an additional embodiment, the attribute requirements for the at least one mobility device include at least one point of handling and/or at least one point of avoidance with respect to one or more of the at least one mobility device associated with the user. In a further embodiment, the attribute requirements for the at least one mobility device include at least one movement recommendation associated with the transport environment. According to such further embodiment, the at least one movement recommendation optionally includes recommended paths within the transport environment and/or locations of avoidance within the transport environment for one or more of the at least one mobility device. For instance, the at least one movement recommendation may include recommended paths and/or locations of avoidance within any room, corridor, doorway, elevator, etc. In a further embodiment, the attribute requirements for the at least one mobility device include a minimum number and/or a maximum number of entities to handle one or more of the at least one mobility device. For instance, in the event that the transport activity occurs within a hospital environment, the attribute requirements may designate a number of medical personnel necessary to handle one or more of the at least one mobility device.

In an embodiment, the plurality of mobility parameters determined in the context of step 220 and optionally derived in the context of the method 400 include at least one point of contact with respect to the user at which to facilitate movement of the user or to otherwise interact with the user during user movement. The at least one point of contact in the context of such mobility parameter is a location with respect to the user at which any entity associated with the transport activity or other relevant aspects of user movement may handle or otherwise interact with the user. The at least one point of contact with respect to the user optionally includes at least one location on the body of the user, at least one location on the clothing of the user, and/or at least one location peripherally associated with the user (e.g., a location on a piece of equipment supporting the user and/or with which the user directly interacts). Additionally or alternatively, the plurality of parameters include at least one point of avoidance with respect to the user. The at least one point of avoidance with respect to the user optionally includes at least one location on the body of the user, at least one location on the clothing of the user, and/or at least one location peripherally associated with the user.

In an embodiment, the plurality of mobility parameters determined in the context of step 220 and optionally derived in the context of the method 400 include a velocity limit with respect to movement of the user. In an embodiment, the velocity limit pertains to measured velocity (e.g., in miles per hour or in kilometers per hour) of one or more of the at least one mobility device associated with the user. The velocity limit may ensure that the user is moved at a pace that reduces potential discomfort and/or minimizes user danger in the context of the transport activity. For instance, the server application may derive an upper velocity limit in order to limit dizziness or other disorientation of the user. Additionally or alternatively, the server application may derive a lower velocity limit in the event that the user must be transported from one location to another location within a restricted duration of time; the server application in such case may calculate the lower velocity limit to ensure that any entity associated with the transport activity or other relevant aspects of user movement is informed of a minimum average speed at which the user must be moved to ensure user movement within the restricted duration of time.

In an embodiment, the plurality of mobility parameters determined in the context of step 220 and optionally derived in the context of the method 400 include a time restriction with respect to movement of the user. In an embodiment, the server application establishes the time restriction by designating a maximum time threshold for one or more phases of the transport activity and/or for the entire transport activity. Such time restriction optionally accounts for any critical movement requirement and/or any boundary of time with respect to user movement. For instance, in the event that the user relies on a stationary machine for life support and must be moved from one location having such stationary machine to another location having such stationary machine during the transport activity, the server application may establish the time restriction mobility parameter by designating a maximum time threshold for the entire transport activity or for one or more phases thereof to ensure that the user is not away from such stationary machine for an excessive duration of time. In a further embodiment, the server application derives both a lower velocity limit and a time restriction with respect to movement of the user.

Figure 5:
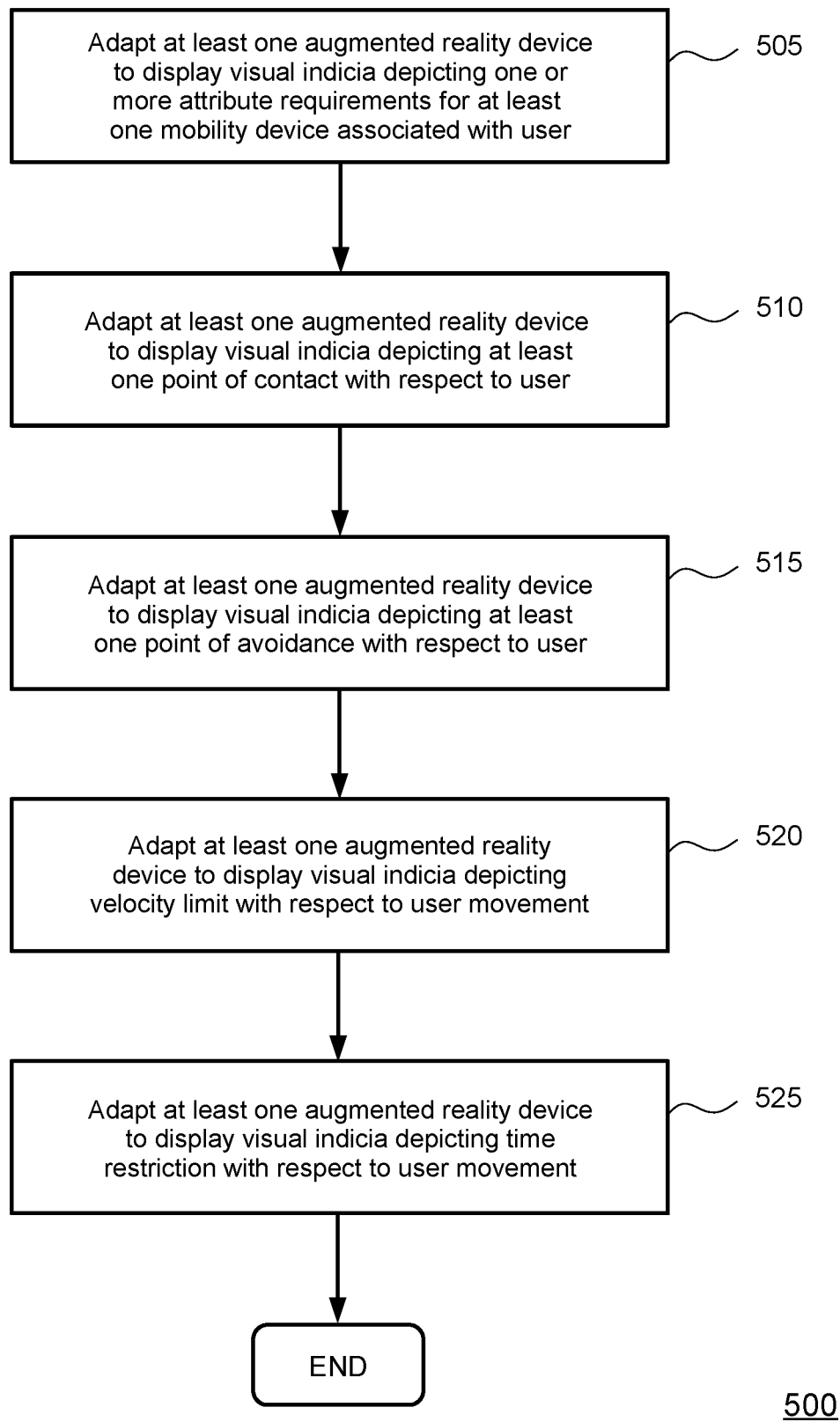
FIG. 5 illustrates a method of adapting at least one augmented reality device to digitally represent at least one mobility recommendation during a transport activity, according to one or more embodiments.

FIG. 5 illustrates a method 500 of adapting the at least one augmented reality device to digitally represent in the at least one augmented reality interface associated therewith the at least one mobility recommendation during the transport activity. The method 500 provides one or more example embodiments with respect to step 230 of the method 200. The method 500 includes steps reflective of the plurality of mobility parameters described in the aforementioned embodiments. The server application optionally executes only a subset of the steps reflective of the mobility parameters and/or optionally executes the steps reflective of the mobility parameters in a different order. Additionally or alternatively, the server application optionally executes steps reflective of one or more mobility parameters not specifically described herein.

The method 500 begins at step 505, where the server application adapts the at least one augmented reality device to display visual indicia in the digital overlay that depict (i.e., graphically represent) one or more of the attribute requirements for the at least one mobility device associated with the user. In an embodiment, the visual indicia include arrows (e.g., in a green color) at or otherwise directed to the at least one point of handling at which it is advisable to handle one or more of the at least one mobility device during the transport activity. In a further embodiment, the visual indicia include arrows (e.g., in a yellow or red color) at or otherwise directed to the at least one point of avoidance, i.e., at least one location at which it is advisable to avoid handling, with respect to one or more of the at least one mobility device during the transport activity. In a further embodiment, the visual indicia reflect the at least one movement recommendation associated with the transport environment. Specifically, the visual indicia may include recommended paths within the transport environment (e.g., depicted by green path lines or confirmatory messages) and/or locations of avoidance (e.g., depicted by yellow/red lines or warning messages) for one or more of the at least one mobility device.

At step 510, the server application adapts the at least one augmented reality device to display visual indicia in the digital overlay that depict the at least one point of contact with respect to the user at which to facilitate movement of the user or to otherwise interact with the user. In an embodiment, the visual indicia include arrows (e.g., in a green color) at or otherwise directed to the at least one point of contact at which it is advisable to handle the user during the transport activity. At step 515, the server application adapts the at least one augmented reality device to display visual indicia in the digital overlay that depict the at least one point of avoidance with respect to the user. In an embodiment, the visual indicia include arrows (e.g., in a yellow or red color) at or otherwise directed to the at least one point of avoidance at which it is advisable to avoid handling the user during the transport activity.

At step 520, the server application adapts the at least one augmented reality device to display visual indicia in the digital overlay that depict the velocity limit with respect to movement of the user. In an embodiment, responsive to determining that movement of the user is approaching an upper velocity limit, the server application adapts the at least one augmented reality device to display visual indicia in the form of caution lines (e.g., yellow lines), a caution sign, and/or a textual caution ahead of a projected path of the user during the transport activity. According to such embodiment, responsive to determining that movement of the user has reached or exceeded the upper velocity limit, the server application adapts the at least one augmented reality device to render and display visual indicia in the form of warning lines (e.g., red lines), a warning sign, and/or a textual warning ahead of the projected path of the user during the transport activity. In a further embodiment, responsive to determining that movement of the user is approaching a lower velocity limit, the server application adapts the at least one augmented reality device to display visual indicia (e.g., a caution sign, a textual caution, corresponding caution lines, etc.) encouraging faster movement during the transport activity. According to such further embodiment, responsive to determining that movement of the user has reached or fallen below the lower velocity limit, the server application adapts the at least one augmented reality device to display visual indicia (e.g., a warning sign, a textual warning, corresponding warning lines, etc.) mandating faster movement. Additionally or alternatively, the server application adapts the at least one augmented reality device to display visual indicia in the form of one or more digital numbers or symbols indicating an upper velocity limit and/or a lower velocity limit.

At step 525, the server application adapts the at least one augmented reality device to display visual indicia in the digital overlay that depict the time restriction with respect to movement of the user. In an embodiment, the server application adapts the at least one augmented reality device to display visual indicia in the form of a digital number or symbol indicating the time restriction. For example, in the event that the transport activity involves critical movement of the user, the server application may adapt the at least one augmented reality device to display a countdown timer or other time-based visual indicia (e.g., an animated hourglass symbol) indicating a duration of time within which the entire transport activity and/or one or more phases thereof must be completed to ensure safe and/or comfortable user movement.

Figure 6:
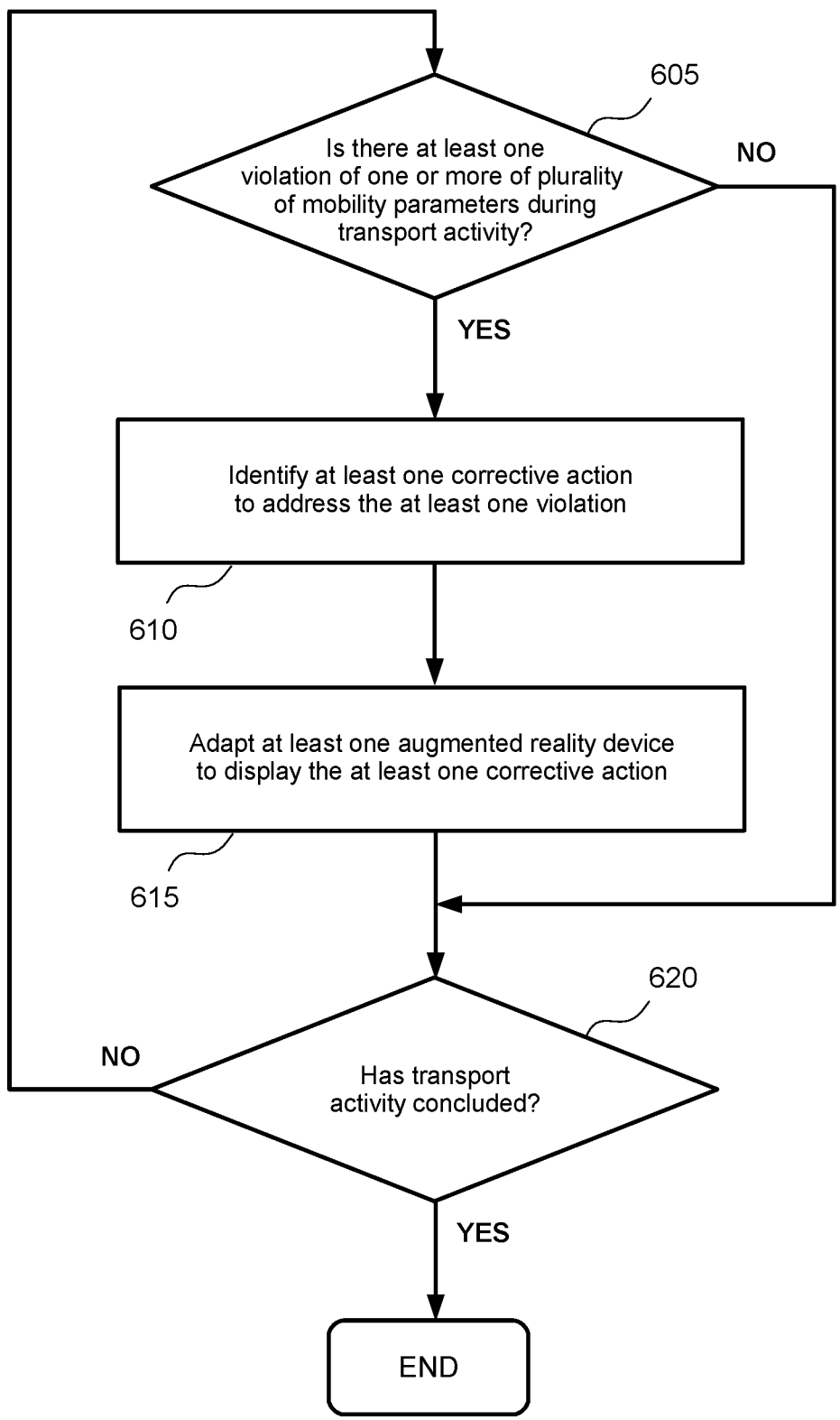
FIG. 6 illustrates a method of adapting at least one augmented reality device to digitally represent at least one mobility recommendation during a transport activity, according to one or more further embodiments.

FIG. 6 illustrates a method 600 of adapting the at least one augmented reality device to digitally represent in the at least one augmented reality interface the at least one mobility recommendation during the transport activity. The method 600 provides one or more further example embodiments with respect to step 230 of the method 200. The method 600 includes steps reflective of one or more of the plurality of mobility parameters described in the aforementioned embodiments. The method 600 may begin at step 605, where the server application determines whether there is at least one violation of one or more of the plurality of mobility parameters during the transport activity. In an embodiment, a violation of one or more of the plurality of mobility parameters may include failure of the at least one mobility device to comply with one or more of the attribute requirements, violation of one or more of the at least one user point of contact, violation of one or more of the at least one user point of avoidance, violation of the velocity limit, and/or violation of the time restriction. In a further embodiment, the server application detects a violation of one or more of the plurality of mobility parameters based upon the server application determining that the comfort level of the user is below the predefined comfort threshold (e.g., either through detection of the comfort level moving below the predefined comfort threshold during the transport activity or through a reading of the comfort level below the predefined comfort threshold at a point in time during the transport activity). Additionally or alternatively, the server application detects a violation of one or more of the plurality of mobility parameters based upon one or more readings from the plurality of biometric sensors indicating user discomfort or danger, such as adverse vital sign readings. Additionally or alternatively, the server application detects a violation of one or more of the plurality of mobility parameters based upon one or more abnormal activities detected from the one or more monitoring devices (e.g., detection via a video feed, an audio feed, an audiovisual feed, or a series of images captured by a photographic device) and/or one or more readings from the plurality of mobility device sensors indicating a user movement fault, such as an equipment malfunction or improper user positioning.

Responsive to determining that there is no violation of one or more of the plurality of mobility parameters, the server application proceeds directly to step 620. Responsive to determining that there is at least one violation of one or more of the plurality of mobility parameters, at step 610 the server application analyzes the at least one violation and identifies at least one corrective action to address the at least one violation, and at step 615 the server application adapts the at least one augmented reality device to display the at least one corrective action in the digital overlay. In an embodiment, to address the at least one violation, the server application adapts the at least one augmented reality device to render and display visual indicia in the digital overlay that depict at least one recommendation for adjusting one or more of the at least one mobility device, for adjusting position of the user with respect to one or more of the at least one mobility device, and/or for moving the user, e.g., in order to return the comfort level of the user to at or above the predefined comfort threshold. Such visual indicia may include one or more arrows indicating recommended adjustment or movement of the user and/or indicating recommended adjustment of one or more of the at least one mobility device. At step 620, the server application determines whether the transport activity has concluded. Responsive to determining that the transport activity has concluded, the server application proceeds to the end of the method 600. Responsive to determining that the transport activity has not concluded, the server application returns to step 605.

In an embodiment, the server application executes one or more steps of the method 500 and one or more steps of the method 600 in the context of the same process. According to such embodiment, the server application executes one or more steps of the method 600 prior to, concurrently with, or subsequent to one or more steps of the method 500. Alternatively, the server application executes one or more steps of the method 600 in a context removed from the steps of the method 500, and/or the server application executes one or more steps of the method 500 in a context removed from the steps of the method 600. In a further embodiment, the server application provides audible (i.e., audio-based) indicia to represent the at least one mobility recommendation during the transport activity in addition to or in lieu of the visual indicia discussed in the context of the methods 500 and 600. Such audible indicia optionally include voice notifications (e.g., warnings) delivered via an audio component (e.g., one or more speakers) operatively coupled to the at least one augmented reality interface.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
constructing a machine learning knowledge model trained based upon medical data from a plurality of individuals and medical data specific to a user;
collecting mobility device sensor data from a plurality of mobility device sensors connected to at least one mobility device associated with the user;
collecting biometric sensor data from a plurality of biometric sensors associated with the user;
identifying per the machine learning knowledge model one or more patterns between certain movements of the user as determined through the collected mobility device sensor data and a relatively lower user comfort level on a predefined comfort scale resulting from adverse data of the user reflective of a certain medical condition as determined through the collected biometric sensor data;
based upon the identified one or more patterns, deriving a plurality of mobility parameters in order to maintain the user comfort level at or above a predefined comfort threshold, wherein the plurality of mobility parameters include at least one point of avoidance with respect to the user or at least one point of contact at which an entity associated with user movement interacts with the user;
determining at least one mobility recommendation for a transport activity in accordance with the plurality of mobility parameters; and
adapting at least one augmented reality device to graphically represent the at least one mobility recommendation during the transport activity by rendering and displaying, in a digital overlay upon a real-world environment representation, pointing indicia directed to the at least one point of avoidance or the at least one point of contact.

2. The computer-implemented method of claim 1, further comprising:
creating a plurality of programmed activities to implement the at least one mobility recommendation during the transport activity.

3. The computer-implemented method of claim 1, wherein constructing the machine learning knowledge model comprises:
storing the medical data from the plurality of individuals in at least one knowledge base;
storing the medical data specific to the user in the at least one knowledge base; and
training the machine learning knowledge model based upon the medical data from the plurality of individuals and the medical data specific to the user.

4. The computer-implemented method of claim 1, wherein the plurality of mobility parameters include attribute requirements for the at least one mobility device.

5. The computer-implemented method of claim 4, wherein adapting the at least one augmented reality device to graphically represent the at least one mobility recommendation during the transport activity comprises:
displaying visual indicia depicting one or more of the attribute requirements.

6. The computer-implemented method of claim 1, wherein the plurality of mobility parameters include a velocity limit with respect to movement of the user.

7. The computer-implemented method of claim 6, wherein adapting the at least one augmented reality device to graphically represent the at least one mobility recommendation during the transport activity comprises:
displaying visual indicia depicting the velocity limit.

8. The computer-implemented method of claim 1, wherein the plurality of mobility parameters include a time restriction with respect to movement of the user.

9. The computer-implemented method of claim 8, wherein adapting the at least one augmented reality device to graphically represent the at least one mobility recommendation during the transport activity comprises:
displaying visual indicia depicting the time restriction.

10. The computer-implemented method of claim 1, wherein adapting the at least one augmented reality device to graphically represent the at least one mobility recommendation during the transport activity comprises:
responsive to detecting at least one violation of one or more of the plurality of mobility parameters during the transport activity:
identifying at least one corrective action to address the at least one violation; and
displaying the at least one corrective action.

11. The computer-implemented method of claim 1, wherein the plurality of mobility parameters include one or more size requirements for the at least one mobility device.

12. The computer-implemented method of claim 1, wherein the plurality of mobility parameters include a reclining angle range with respect to the at least one mobility device.

13. The computer-implemented method of claim 1, wherein the plurality of mobility parameters include a vibration limit associated with the at least one mobility device.

14. The computer-implemented method of claim 1, wherein the plurality of mobility parameters include a device cushioning requirement with respect to the at least one mobility device.

15. The computer-implemented method of claim 1, wherein the at least one point of contact includes at least one location on the body of the user.

16. The computer-implemented method of claim 1, wherein adapting the at least one augmented reality device to graphically represent the at least one mobility recommendation during the transport activity comprises:
displaying visual confirmatory indicia depicting recommended paths for one or more of the at least one mobility device within a transport environment associated with the transport activity.

17. The computer-implemented method of claim 1, wherein adapting the at least one augmented reality device to graphically represent the at least one mobility recommendation during the transport activity comprises:
displaying visual warning indicia depicting locations of avoidance for one or more of the at least one mobility device within a transport environment associated with the transport activity.

18. The computer-implemented method of claim 1, wherein the at least one augmented reality device is hardware-based.

19. A computer program product comprising a computer readable storage medium having program instructions embodied therewith, the program instructions executable by a computing device to cause the computing device to:
construct a machine learning knowledge model trained based upon medical data from a plurality of individuals and medical data specific to a user;
collect mobility device sensor data from a plurality of mobility device sensors connected to at least one mobility device associated with the user;
collect biometric sensor data from a plurality of biometric sensors associated with the user;
identify per the machine learning knowledge model one or more patterns between certain movements of the user as determined through the collected mobility device sensor data and a relatively lower user comfort level on a predefined comfort scale resulting from adverse data of the user reflective of a certain medical condition as determined through the collected biometric sensor data;
based upon the identified one or more patterns, derive a plurality of mobility parameters in order to maintain the user comfort level at or above a predefined comfort threshold, wherein the plurality of mobility parameters include at least one point of avoidance with respect to the user or at least one point of contact at which an entity associated with user movement interacts with the user;
determine at least one mobility recommendation for a transport activity in accordance with the plurality of mobility parameters; and
adapt at least one augmented reality device to graphically represent the at least one mobility recommendation during the transport activity by rendering and displaying, in a digital overlay upon a real-world environment representation, pointing indicia directed to the at least one point of avoidance or the at least one point of contact.

20. A system comprising:
a processor; and
a memory storing an application program, which, when executed on the processor, performs an operation comprising:
constructing a machine learning knowledge model trained based upon medical data from a plurality of individuals and medical data specific to a user;
collecting mobility device sensor data from a plurality of mobility device sensors connected to at least one mobility device associated with the user;
collecting biometric sensor data from a plurality of biometric sensors associated with the user;
identifying per the machine learning knowledge model one or more patterns between certain movements of the user as determined through the collected mobility device sensor data and a relatively lower user comfort level on a predefined comfort scale resulting from adverse data of the user reflective of a certain medical condition as determined through the collected biometric sensor data;
based upon the identified one or more patterns, deriving a plurality of mobility parameters in order to maintain the user comfort level at or above a predefined comfort threshold, wherein the plurality of mobility parameters include at least one point of avoidance with respect to the user or at least one point of contact at which an entity associated with user movement interacts with the user;
determining at least one mobility recommendation for a transport activity in accordance with the plurality of mobility parameters; and
adapting at least one augmented reality device to graphically represent the at least one mobility recommendation during the transport activity by rendering and displaying, in a digital overlay upon a real-world environment representation, pointing indicia directed to the at least one point of avoidance or the at least one point of contact.

\* \* \* \* \*